Oct. 28, 1958     H. W. RUNDQUIST     2,857,926
MANIFOLD HEAT CONTROL VALVE
Filed Feb. 5, 1953
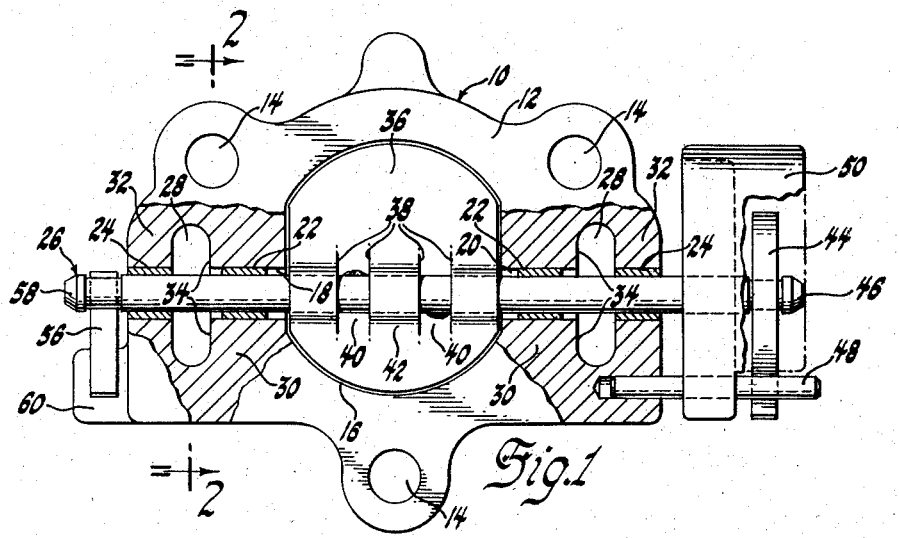
Fig. 1
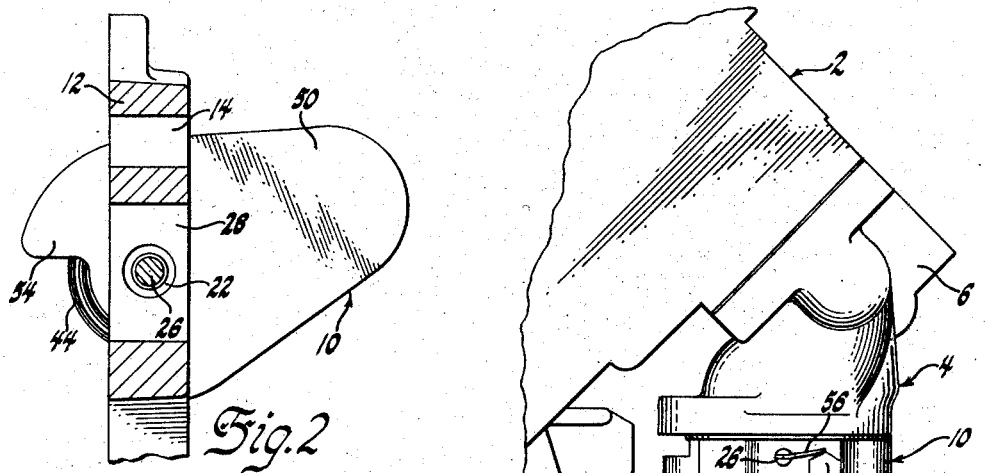
Fig. 2
Fig. 4
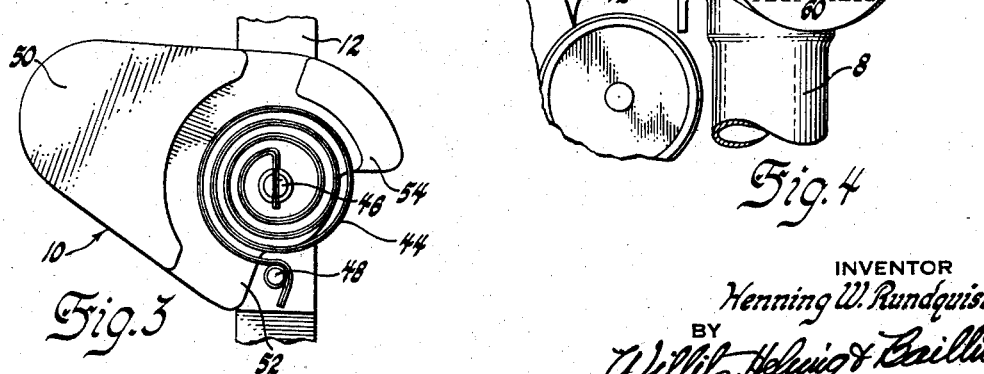
Fig. 3
INVENTOR
Henning W. Rundquist
BY
Willits, Helwig & Baillio
ATTORNEYS

United States Patent Office 2,857,926
Patented Oct. 28, 1958

2,857,926

MANIFOLD HEAT CONTROL VALVE

Henning W. Rundquist, East Lansing, Mich., assignor to General Motors Corporation, Detroit, Mich., a corporation of Delaware Application February 5, 1953, Serial No. 335,307

3 Claims. (Cl. 137—338)

This invention relates to a device for controlling the flow of a fluid through a passage such as may be employed within the exhaust system of an engine and for other purposes.

Fluid flow control devices may be employed within the exhaust system of an engine to prevent or restrict the flow of exhaust gases from the engine for the purpose of redirecting the hot gases about the engine intake manifold. The exhaust gases flowing about the intake manifold tend to heat other gases flowing into the engine, increasing their combustible characteristics, and enabling greater ease in starting the engine.

In the past, difficulty has been experienced in obtaining a fluid flow control valve adaptable for such purposes which will not have a tendency to seize or bind due to the corrosive effects of the exhaust gases and their high temperatures upon the journaled members of the valve. Although attempts have been made to develop a control valve which will be adaptable for use with engine exhaust systems, such devices still are not entirely successful from both the practical and economical standpoint. Increasing the tolerances between the valve shaft and its bearings provides an inexpensive means of minimizing the possibilities of seizure but is unadvisable because of the excessive noise caused by the pulsating exhaust gases acting directly upon the valve mechanism and rattling the loosely journaled members within their housing. The use of a device having more complicated passage and bearing means to provide a satisfactory control valve is also undesirable due to the excessive production costs.

It is now proposed to provide a device for controlling the flow of a fluid which is adaptable for use within the exhaust system of an internal combustion engine and which will not be adversely affected by the nature of the fluid flowing therethrough.

It is intended to provide a means of separating the journaled members of the fluid flow control device from the fluid flow passage to minimize the detrimental effects of corrosion which may be caused by the fluid and to also separate such members from the walls forming the fluid flow passage to minimize the conduction of excessive heat which may be passed-off by the fluid to such members. It is further intended to provide a vertical separation formed betwen the journaled members and the flow passage which will promote an induced draft therebetween and enhance the cooling of the journaled members. These improvements are intended to enable the manufacture of an inexpensive, efficient, dependable, and durable fluid flow control device suitable for use within engine exhaust systems and for other purposes.

In the drawings:

Figure 1 is a plan view of the proposed fluid control device partially broken away and cross-sectioned to more clearly show the principal features of the invention.

Figure 2 is a cross-sectioned side elevational view of the proposed device taken substantially in the plane of lines 2—2 of Figure 1 viewed in the direction of the arrows thereon.

Figure 3 is a side elevational view of the proposed device showing a suitable means for controlling the valve mechanism.

Figure 4 is a fragmentary view of an internal combustion engine showing the proposed control device secured between the exhaust manifold and the exhaust conduit of the engine.

In the accompanying drawing is shown an internal combustion engine 2 having an exhaust system 4 associated therewith comprising an exhaust manifold 6 and an exhaust conduit 8 through which exhaust gases are adapted to flow from the engine. A fluid flow control device 10 is secured within the exhaust system of the engine between the exhaust manifold 6 and the exhaust conduit 8 for the purpose of temporarily restricting or preventing the flow of exhaust gases from the engine 2 and to redirect or baffle the heated exhaust gases back around the engine.

Although the proposed fluid flow control device 10 may be secured within the exhaust system 4 of an engine or other similar fluid flow system in any of a number of locations and in various positions, in the present instance the control device comprises a housing or plate member 12 which has a plurality of holes 14 formed therethrough by means of which the control device is adapted to be bolted to the exhaust manifold 6 in a horizontal position. A passage 16 is vertically formed through the plate member 12 contiguous with passages formed in the exhaust manifold 6 and exhaust conduit 8 to enable the flow of exhaust gases from the engine 2.

Openings 18 and 20 are formed through the plate member 10 on each side of the fluid flow passage 16 and have bushings 22 and 24 mounted within and near the inner and outer ends of the openings. The openings 18 and 20 are axially aligned and transversely disposed with respect to the flow passage 16 and are adapted to receive a rotatable valve shaft 26 extending through the flow passage and journaled in the bushings 22 and 24. The inner bushing 22 about the valve shaft 26 is adjacent the fluid flow passage 16 and acts as a partial seal to prevent the escape of excessive exhaust gases from the fluid flow passage 16 and through the openings 18 and 20. The outer bushings 24 are mounted in spaced relation to the inner bushings 22 and are separated therefrom by slots or vents 28 formed through the plate member 12 and intersecting the openings 18 and 20. The vents 28 formed in said plate member 12 are transversely disposed with respect to the openings 18 and 20 and extend through the plate member to separate the portion 30 of the valve plate 12 formed about the flow passage 16 from the plate elements 32 in which the outer bushings 24 are mounted.

The vent slots 28 are vertically positioned to promote an induced draft by means of which heated exhaust gases passing from the fluid flow passage 16 past the inner bushing 22 and through the openings 18 and 20 will escape to the atmosphere. Such air as may be heated by the walls 34 about the fluid flow passage 16 and adjacent the vent slots 28 will also be carried away and thereby provide a means of maintaining a cooler bushing in the plate elements 32 on the opposite side of the vent slot 28. The tolerances between the inner bushing 22 and the shaft 26 may be greater than those between the outer bushing 24 and the shaft 26 in order to prevent the shaft from freezing to the inner bushing and since the outer bushing 24 will prevent any rattling of the shaft 26 therein.

A valve plate 36 is secured to the valve shaft 26 within the fluid flow passage and is adapted to substantially close off the passage 16 when horizontally positioned and to provide little or no appreciable restriction to the flow of fluid through the passage 16 when vertically positioned.

The valve plate 36 is adapted to be secured to the shaft 26 by having slits 38 formed in the valve plate and by oppositely diverging the plate material 40 and 42 adjacent the slits 38 to provide access for the valve shaft 26 therethrough.

Any suitable control means may be connected to the valve shaft 26 to rotate the shaft and alter the position of the valve plate 36 within the fluid flow passage 16. In the present instance a bimetal spring 44 is secured between the end 46 of the valve shaft 26 and a post or stop member 48 connected directly to the plate member 12. The exhaust gases flowing over the valve plate 36 and the valve shaft 26 within the fluid flow passage 16 will pass off heat which will be conducted through the valve shaft 26 to actuate the bimetal spring 44. Contraction or expansion of the spring member 44 will rotate the valve shaft 26 and thereby alter the position of the valve plate 36 within the fluid flow passage 16. A counterweighted element 50 is also adapted to be secured to the valve shaft 26 externally of the plate member 12 to assist the bimetal spring 44 in positioning the valve plate 36 within the flow passage 16. The counterweight 50 is formed so as to provide limiting stops 52 and 54 which will respectively position the valve plate 36 in an open or closed position within the fluid flow passage 16. An additional stop element 56 may be connected to the other end 58 of the valve shaft 26 to bear against a shoulder 60 formed on the plate member 12 and further assure proper positioning of the valve plate 36 within the fluid flow passage.

I claim:

1. A heat flow control valve comprising a housing having a heat flow passage formed therethrough, a valve shaft journalled within opposite walls of said passage and extending transversely across said passage, a valve plate secured transversely across said shaft within said passage, means for rotating said shaft for positioning said valve plate across said passage, sealing means and bearing means disposed about said shaft on opposite sides of said valve plate, and vent openings formed through said housing intermediate said bearing and sealing means on opposite sides of said valve plate for the circulation of air through said openings and about the outer ends of said shaft disposed inwardly of said bearing means.

2. A fluid flow control device including a housing having a fluid flow passage formed therethrough, valve means disposed within said passage and including control means extended through said housing, a sealing means disposed within said housing and about said control means at either side of said valve means, bearing means disposed within said housing and about said control means at either end thereof and in spaced relation to each of said sealing means, and elongated atmospheric vent openings formed through said housing between each of said sealing and bearing means and intersecting said control means transversely thereof for cooling said control and said bearing means and for draining away condensate collected thereabout.

3. Means for controlling the flow of hot exhaust gases through an engine exhaust system which includes, a unitary housing adapted to be received within said system and having a registering flow passage formed therethrough, valve means disposed within said passage and including valve control means extended across said passage and exposed to said hot engine exhaust gases flowing therethrough, said control means having each of the ends thereof journaled within said housing near the outer walls thereof, and sealing means disposed in said housing around said control means adjacent either side of said passage, said housing being relieved about said control means between the journaled end and the sealing means on each side of said passage to provide openings about said shaft extending through said housing on opposite sides of said shaft for dissipating heat conducted from said passage by said control means and for draining condensate collected thereon away from the journaled ends thereof.

References Cited in the file of this patent

UNITED STATES PATENTS

| | | |
|---|---|---|
| 474,227 | Dexter | May 3, 1892 |
| 1,572,922 | Govers | Feb. 16, 1926 |
| 1,605,083 | Tymstra | Nov. 2, 1926 |
| 1,858,587 | Grant | May 17, 1932 |
| 1,953,540 | Ogden | Apr. 3, 1934 |
| 1,954,192 | Biggs | Apr. 10, 1934 |
| 2,058,996 | Kollberg | Oct. 27, 1936 |
| 2,564,112 | Kittler | Aug. 14, 1951 |
| 2,603,444 | Armstrong | July 15, 1952 |